United States Patent
Kang et al.

(10) Patent No.: US 9,248,719 B2
(45) Date of Patent: Feb. 2, 2016

(54) DUAL ZONE TYPE AIR CONDITIONER FOR VEHICLES AND METHOD OF CONTROLLING THE SAME

(75) Inventors: Sungho Kang, Daejeon-si (KR); Hwanmyeong Jung, Daejeon-si (KR); Seojun Yoon, Daejeon-si (KR); Yongeun Seo, Daejeon-si (KR)

(73) Assignee: Halla Visteon Climate Control Corporation, Daejeon (KR)

( * ) Notice: Subject to any disclaimer, the term of this patent is extended or adjusted under 35 U.S.C. 154(b) by 1316 days.

(21) Appl. No.: 12/476,345

(22) Filed: Jun. 2, 2009

(65) Prior Publication Data
US 2010/0043470 A1 Feb. 25, 2010

(30) Foreign Application Priority Data

Aug. 20, 2008 (KR) .................. 10-2008-0081422
Feb. 11, 2009 (KR) .................. 10-2009-0010958

(51) Int. Cl.
*B60H 1/32* (2006.01)
*B60H 1/00* (2006.01)

(52) U.S. Cl.
CPC ...... *B60H 1/00064* (2013.01); *B60H 2001/002* (2013.01); *B60H 2001/00192* (2013.01); *B60H 2001/00721* (2013.01)

(58) Field of Classification Search
CPC ............ B60H 1/00064; B60H 2001/00192; B60H 2001/002; B60H 2001/00721
USPC ............ 62/186, 239, 244; 165/42, 43, 203; 454/75, 161, 239, 333
See application file for complete search history.

(56) References Cited

U.S. PATENT DOCUMENTS

| 4,460,036 A | * | 7/1984 | Yoshimi et al. | 165/203 |
| 4,537,245 A | * | 8/1985 | Nishimura et al. | 165/203 |
| 4,759,269 A | * | 7/1988 | Brown et al. | 454/75 |
| 4,842,047 A | * | 6/1989 | Sakurada et al. | 165/43 |
| 5,390,728 A | * | 2/1995 | Ban | 165/204 |
| 5,699,960 A | * | 12/1997 | Kato et al. | 237/2 A |
| 6,145,754 A | * | 11/2000 | Uemura et al. | 237/12.3 A |
| 6,192,698 B1 | * | 2/2001 | Kakehashi et al. | 62/227 |
| 6,311,763 B1 | * | 11/2001 | Uemura et al. | 165/43 |
| 6,945,060 B2 | * | 9/2005 | Tomita et al. | 62/157 |
| 7,246,657 B2 | * | 7/2007 | Oga et al. | 165/203 |
| 2003/0116303 A1 | * | 6/2003 | Kang et al. | 165/42 |

(Continued)

FOREIGN PATENT DOCUMENTS

| JP | 03-148324 A | 6/1991 |
| JP | 9249017 A | 9/1997 |

(Continued)

*Primary Examiner* — Marc Norman
*Assistant Examiner* — Paolo Gonzalez
(74) *Attorney, Agent, or Firm* — Norton Rose Fulbright US LLP

(57) ABSTRACT

The present invention relates to a dual zone type air conditioner for vehicles, which includes two air volume controlling doors mounted on an air inflow port of an air-conditioning case where the cross section of an air passageway is uniform and a flow of air is relatively uniform, a sealing wall mounted between the air volume controlling doors, and a controlling part mounted for selecting a more air volume side as a level of a blower when an air volume set by a driver and an air volume set by a passenger are different from each other and controlling the air volume controlling doors to supply the set air volumes to a driver's seat side and a passenger's seat side.

3 Claims, 9 Drawing Sheets

(56) References Cited

U.S. PATENT DOCUMENTS

2005/0263277 A1* 12/2005 Kim .............................. 165/203
2007/0137833 A1* 6/2007 Kang et al. ...................... 165/42

FOREIGN PATENT DOCUMENTS

| JP | 11245644 A | 9/1999 |
| JP | 2005-313892 A | 11/2005 |

* cited by examiner

Prior Art

DUAL ZONE TYPE AIR CONDITIONER FOR VEHICLES AND METHOD OF CONTROLLING THE SAME

RELATED APPLICATIONS

This application claims priority from Korean Patent Application No. KR-10-2008-0081422 filed Aug. 20, 2008 and KR-10-2009-0010958 filed Feb. 11, 2009, each of which is incorporated herein by reference in its entirety.

BACKGROUND OF THE INVENTION

1. Field of the Invention

The present invention relates to a dual zone type air conditioner for vehicles, and more particularly, to such a dual zone type air conditioner for vehicles, which includes two air volume controlling doors mounted on an air inflow port of an air-conditioning case where the cross section of an air passageway is uniform and a flow of air is relatively uniform, a sealing wall mounted between the air volume controlling doors, and a controlling part mounted for selecting a more air volume side as air volume level of a blower when an air volume set by a driver and an air volume set by a passenger are different from each other and controlling the air volume controlling doors to supply the set air volumes to a driver's seat side and a passenger's seat side, thereby controlling right and left air volumes accurately and minutely, reducing a noise according to positions of the air volume controlling doors, symmetrically using setting values of working positions of the air volume controlling doors of the driver's seat side and the passenger's seat side and using a setting value of each air-conditioning mode as it is without changing the setting value by each air-conditioning mode since the air volume controlling doors are mounted at places each having a uniform cross section of the air passageway, reducing a development period of the air conditioner, simplifying a working logic of the air volume conditioning doors, and preventing errors.

2. Background Art

In general, an air conditioner for vehicles is a car interior component, which is installed in the vehicle heat for the purpose of cooling the inside of the vehicle in the summer season or the winter season or removing frost from a windshield in rainy season or winter season to thereby secure a driver's front and rear visual field. Since such an air conditioner typically includes a heating device and a cooling device together, so that it heats, cools or ventilates the inside of the vehicle through the steps of selectively introducing the inside air or the outside air to the air conditioner through a blower unit, heating or cooling the introduced air, and blowing the heated or cooled air into the vehicle.

Such an air conditioner is classified into a three-piece type where a blower unit, an evaporator unit, and a heater core unit are disposed independently, a semi-center type where the evaporator unit and the heater core unit are embedded in an air-conditioning case and the blower unit is mounted separately, and a center-mounting type where the three units are all embedded in the air-conditioning case.

Meanwhile, recently, a dual zone type air conditioner has been applied to a vehicle. The dual zone type air conditioner is a device for separately heating or cooling a driver's seat and a front passenger's seat of the vehicle by providing the driver's seat and the front passenger's seat with air of different temperature as occasion demands.

FIG. 1 is a configurative view of a dual zone type air conditioner for vehicles according to a prior art.

As shown in the drawing, the dual zone type air conditioner 1 includes: an air-conditioning case 20 having an air inflow port 27 formed on an inlet thereof, a plurality of air outflow ports 28 mounted on an outlet thereof, and air passageways 26a and 26b formed inside the air-conditioning case 20 in such a way as to communicate the air inflow port 27 and the air outflow ports 28 with each other; an evaporator 2 and a heater core 3 spaced apart from each other at a predetermined interval and mounted on the air passageways 26a and 26b in order; a partition wall 30 for partitioning the downstream side air passageways 26a and 26b of the evaporator 2 into right and left air passageways 26a and 26b; and a blower 10 mounted on the air inflow port 27 of the air-conditioning case 20.

Here, the air-conditioning case 20 is divided into right and left cases relative to the partition wall 30 and the divided cases are assembled with each other.

Furthermore, temperature-adjusting doors 25 for adjusting temperature are respectively mounted on the right and left air passageways 26a and 26b between the evaporator 2 and the heater core 3, and each of the air outflow ports 28 of the right and left air passageways 26a and 26b has a plurality of mode doors 24 to thereby perform various air-conditioning modes (a vent mode, a bi-level mode, a floor mode, a mix mode, and a defrost mode) while adjusting a degree of opening of the corresponding air outflow port 28.

Moreover, the blower 10 includes: inside and outside air inlets (not shown) mounted on an upper portion thereof and opened and closed by an inside and outside air converting door (not shown) to selectively introduce inside and outside air; and a blast fan 15 mounted therein for blowing the air introduced through the inside and outside air inlets toward the air-conditioning case 20.

Additionally, an air volume controlling door 40 is mounted in front of the evaporator 2 to independently control the air volume blown from the blower 10 to the right and left air passageways 26a and 26b of the air-conditioning case 20.

In the conventional dual zone type air conditioner 1 having the above configuration, the inside or outside air introduced to the inside of the air-conditioning case by the blower 10 is cooled while passing through the evaporator 2 (when the air conditioner is turned on), separately introduced into the right and left air passageways 26a and 26b by the partition wall 30, selectively heated by the heater core 3, and provided to the driver's seat or the passenger's seat inside the vehicle through each of the air outflow ports 28 formed in the downstream of the air passageways 26a and 26b to thereby independently heat or cool the driver's seat space or the passenger's seat space inside the vehicle.

In addition, the temperature-adjusting doors 25 respectively mounted on the right and left air passageways 26a and 26b of the air-conditioning case 20 and the air volume controlling door 40 mounted in front of the evaporator 2 can independently control temperature and volume of the air discharged to the driver's seat and the passenger's seat.

However, as shown in FIG. 1, since only one air volume controlling door 40 is mounted in front of the evaporator 2 where a flow of air is relatively uneven due to a uneven cross section of the air passageways, it is difficult to control the air volume of the right and left sides accurately and to control the air volume minutely, and a noise is generated due to a narrow area of the air when the air volume controlling door 40 is located at the minimum air volume spot.

Furthermore, when the air volume controlling door 40 is mounted at a place where the cross section of each air passageway is uneven, in order to set a working position of the air volume controlling door 40, the driver's seat side (left side) is set by air volume level (for instance, from the first level to the seventh level) of the blower, and then, the passenger's seat side (right side) is set by air volume level of the blower. Moreover, the conventional dual zone type air conditioner 1 has another problem in that it takes much time to develop the air conditioner since the driver's seat side and the passenger's seat side must be set by air volume level of the blower according to the air-conditioning modes.

SUMMARY OF THE INVENTION

Accordingly, the present invention has been made to solve the above-mentioned problems occurring in the prior arts, and it is an object of the present invention to provide a dual zone type air conditioner for vehicles, which includes two air volume controlling doors mounted on an air inflow port of an air-conditioning case where the cross section of an air passageway is uniform and a flow of air is relatively uniform, a sealing wall mounted between the air volume controlling doors, and a controlling part mounted for selecting a more air volume side as air volume level of a blower when an air volume set by a driver and an air volume set by a passenger are different from each other and controlling the air volume controlling doors to supply the set air volumes to a driver's seat side and a passenger's seat side, thereby controlling right and left air volumes accurately and minutely, reducing a noise according to positions of the air volume controlling doors, symmetrically using setting values of working positions of the air volume controlling doors of the driver's seat side and the passenger's seat side and using a setting value of each air-conditioning mode as it is without changing the setting value by each air-conditioning mode since the air volume controlling doors are mounted at places each having a uniform cross section of the air passageway, reducing a development period of the air conditioner, simplifying a working logic of the air volume conditioning doors, and preventing errors.

To accomplish the above objects, according to the present invention, there is provided a dual zone type air conditioner for vehicles, which includes: an air-conditioning case having an air inflow port formed on an inlet thereof, a plurality of air outflow ports mounted on an outlet thereof, and air passageways formed therein in such a way as to communicate the air inflow port and the air outflow ports with each other; an evaporator and a heater core spaced apart from each other at a predetermined interval and mounted on the air passageways of the air-conditioning case; a partition wall for partitioning the downstream side air passageways of the evaporator into right and left air passageways; and blowers each being mounted on the air inflow port of the air-conditioning case in such a way that its outlet is connected to the air inflow port, characterized in that the dual zone type air conditioner comprises: a plurality of air volume controlling doors mounted in the passageways located between the evaporator and the blowers in such a way as to control a volume of air blown to the right and left air passageways of the air-conditioning case; and a sealing wall formed between the air volume controlling doors located inside the passageways to partition the air volume controlling doors.

In another aspect, there is provided method for controlling a dual zone type air conditioner for vehicles comprising: a first step of comparing blower levels of a driver's seat side and a passenger's seat side with each other; a second step of selecting the blower levels of the driver's seat side and the passenger's seat side as a blower level when the blower levels of the driver's seat side and the passenger's seat side are the same as a comparison result of the first step; a third step of selecting the blower level of the driver's seat side as a blower level when the blower level of the driver's seat side is higher than the blower level of the passenger's seat side as a comparison result of the first step; and a fourth step of selecting the blower level of the passenger's seat side as a blower level when the blower level of the passenger's seat side is higher than the blower level of the driver's seat side as a comparison result of the first step.

Accordingly, the dual zone type air conditioner for vehicles according to the present invention can control right and left air volumes accurately and minutely and reduce a noise according to positions of the air volume controlling doors since the air conditioner includes two air volume controlling doors mounted on an air inflow port of an air-conditioning case where the cross section of an air passageway is uniform and a flow of air is relatively uniform, a sealing wall mounted between the air volume controlling doors, and a controlling part mounted for selecting a more air volume side as a level of a blower when an air volume set by a driver and an air volume set by a passenger are different from each other and controlling the air volume controlling doors to supply the set air volumes to a driver's seat side and a passenger's seat side.

Furthermore, the present invention can realize a perfect dual zone type air conditioning system since the auxiliary partition wall is mounted between the air volume controlling doors and the evaporator to thereby prevent mixing of right and left side airs separated from each other in the air volume controlling doors.

Moreover, the dual zone type air conditioner for vehicles according to the present invention can symmetrically use setting values of working positions of the air volume controlling doors of the driver's seat side and the passenger's seat side and use a setting value of each air-conditioning mode as it is without changing the setting value by each air-conditioning mode since the air volume controlling doors are mounted at places each having a uniform cross section of the air passageway, reduce a development period of the air conditioner, and simplify a working logic of the air volume conditioning doors, and preventing errors.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
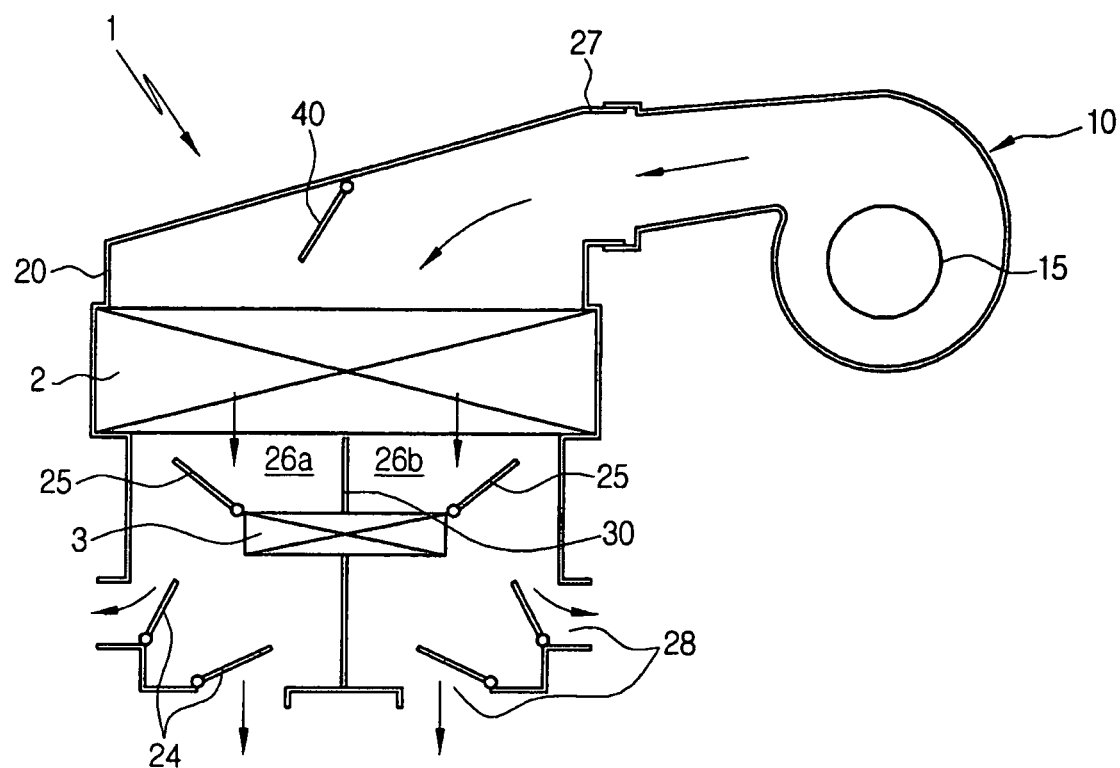
FIG. 1 is a configurative view of a dual zone type air conditioner for vehicles according to a prior art.
Figure 2:
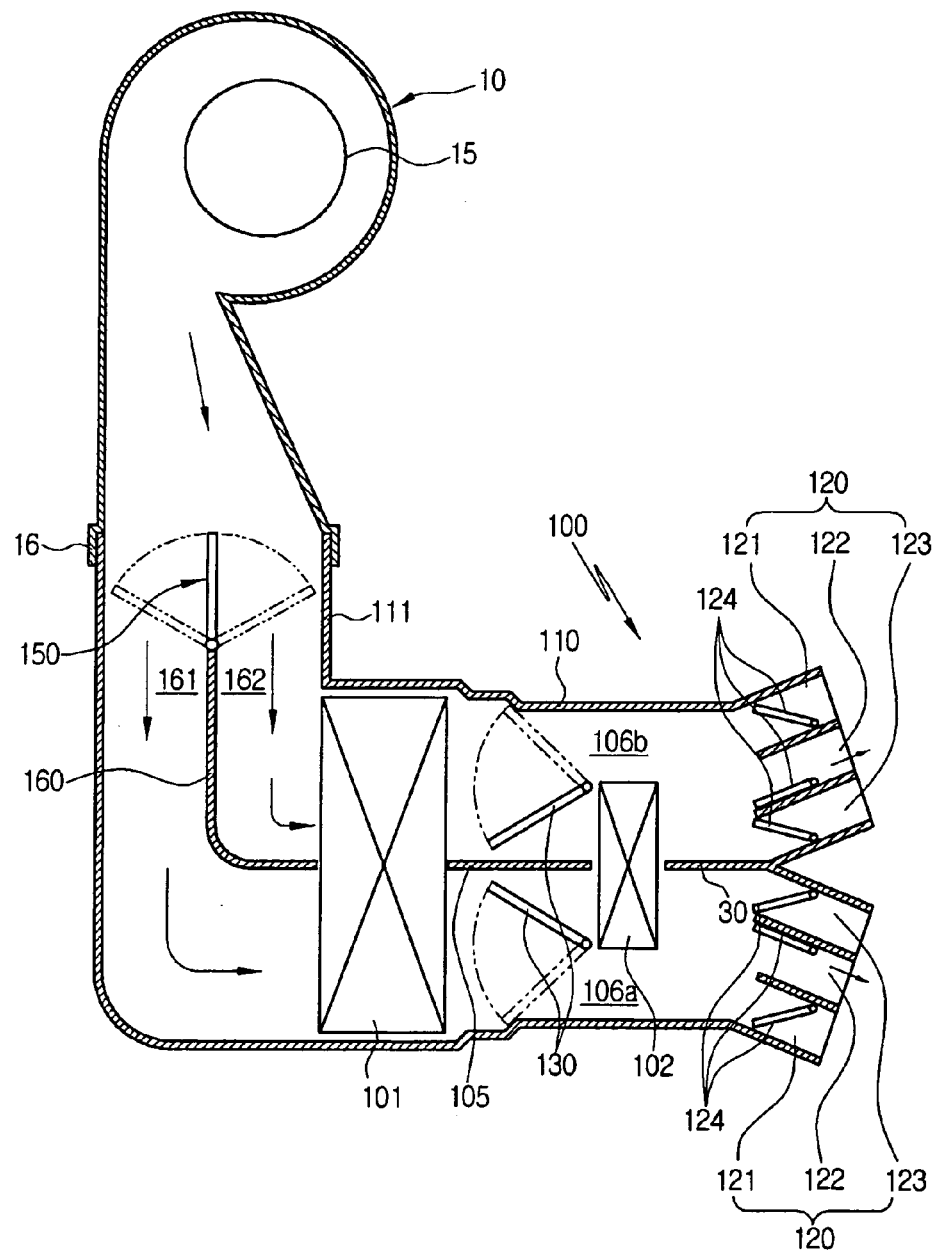
FIG. 2 is a configurative view of a dual zone type air conditioner for vehicles according to the present invention.
Figure 3:
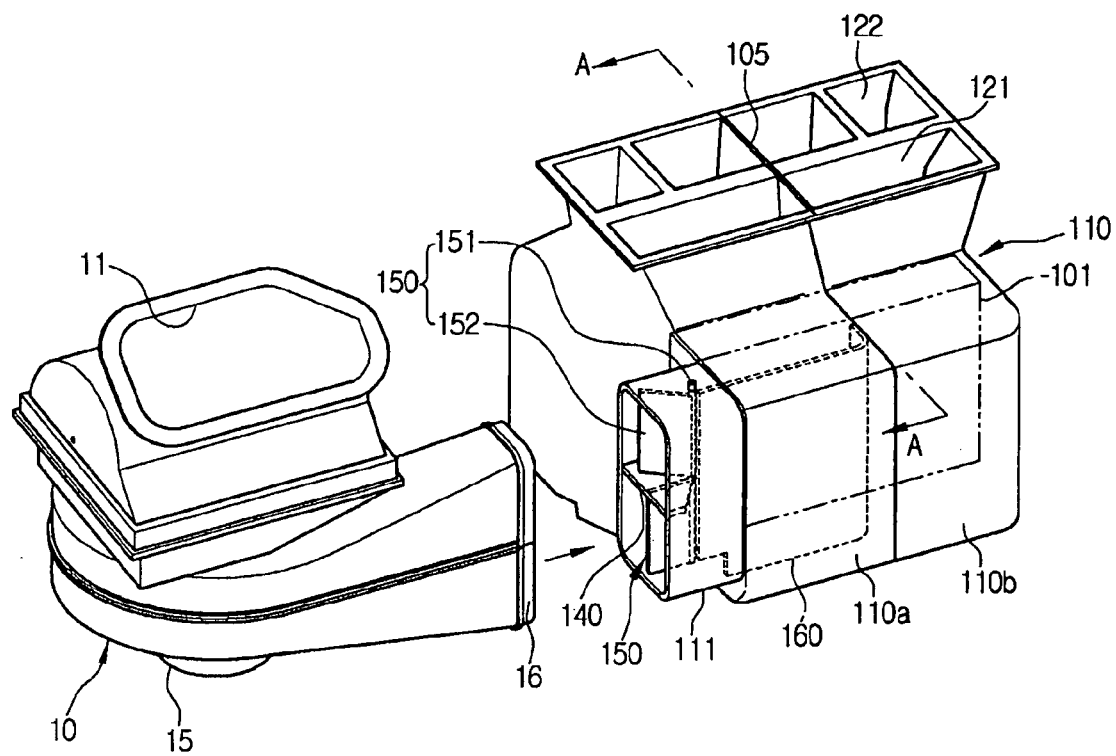
FIG. 3 is a perspective view showing a state where the dual zone type air conditioner according to the present invention is applied to a semi-center type air conditioner.
Figure 4:
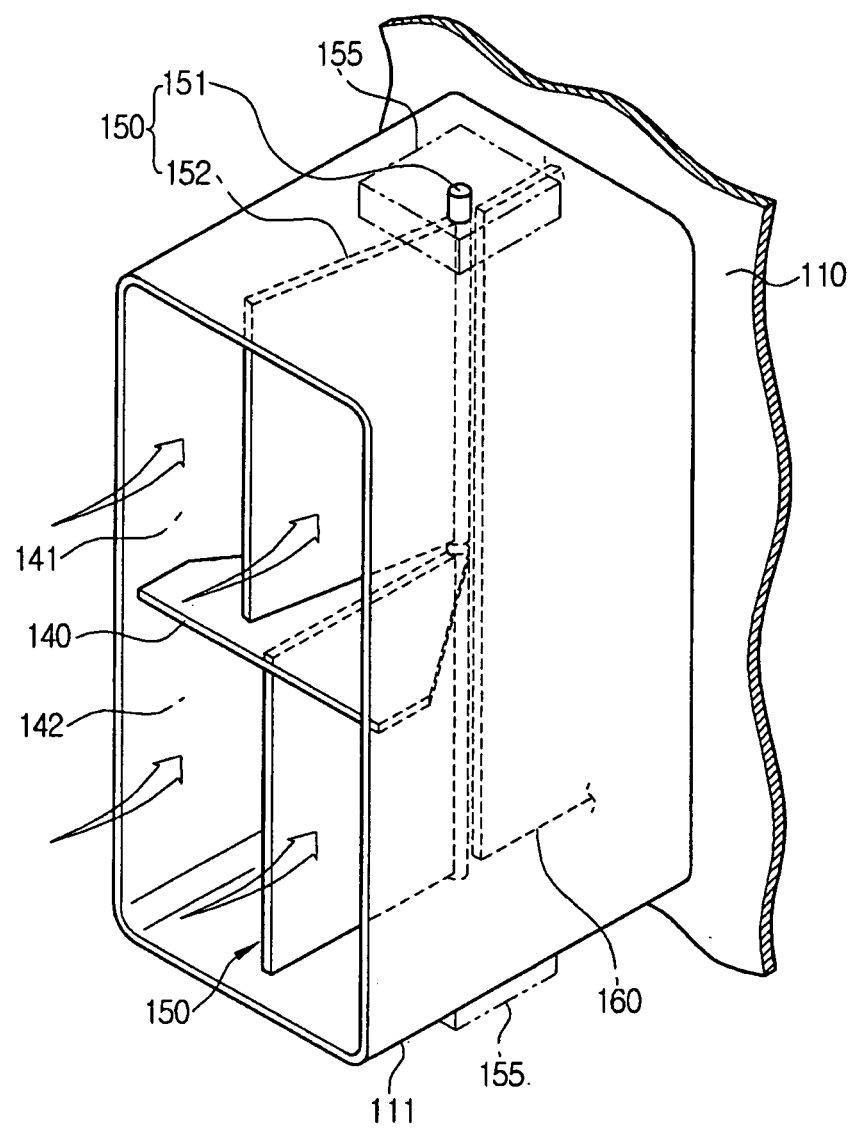
FIG. 4 is an enlarged perspective view showing a part where an air volume controlling door of FIG. 3 is mounted.
Figure 5:
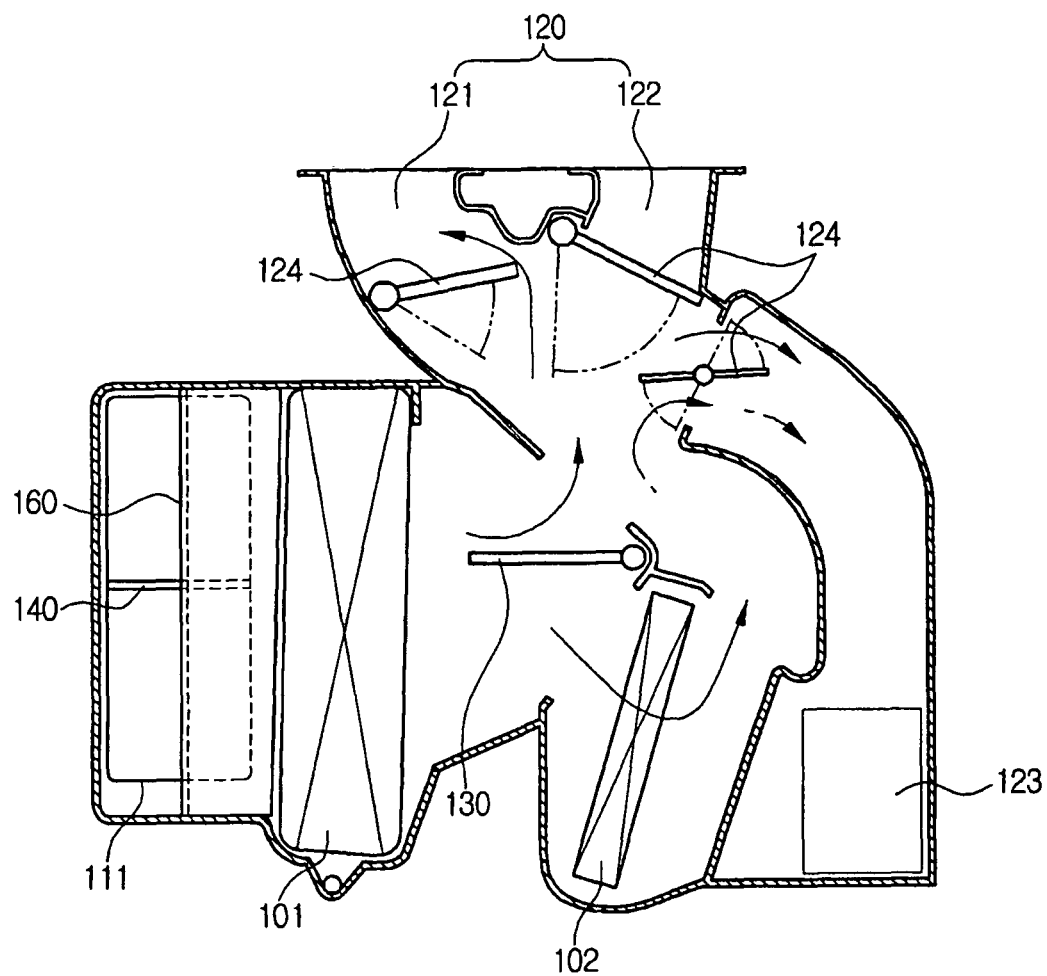
FIG. 5 is a sectional view taken along the line of A-A of FIG. 3.
Figure 6:
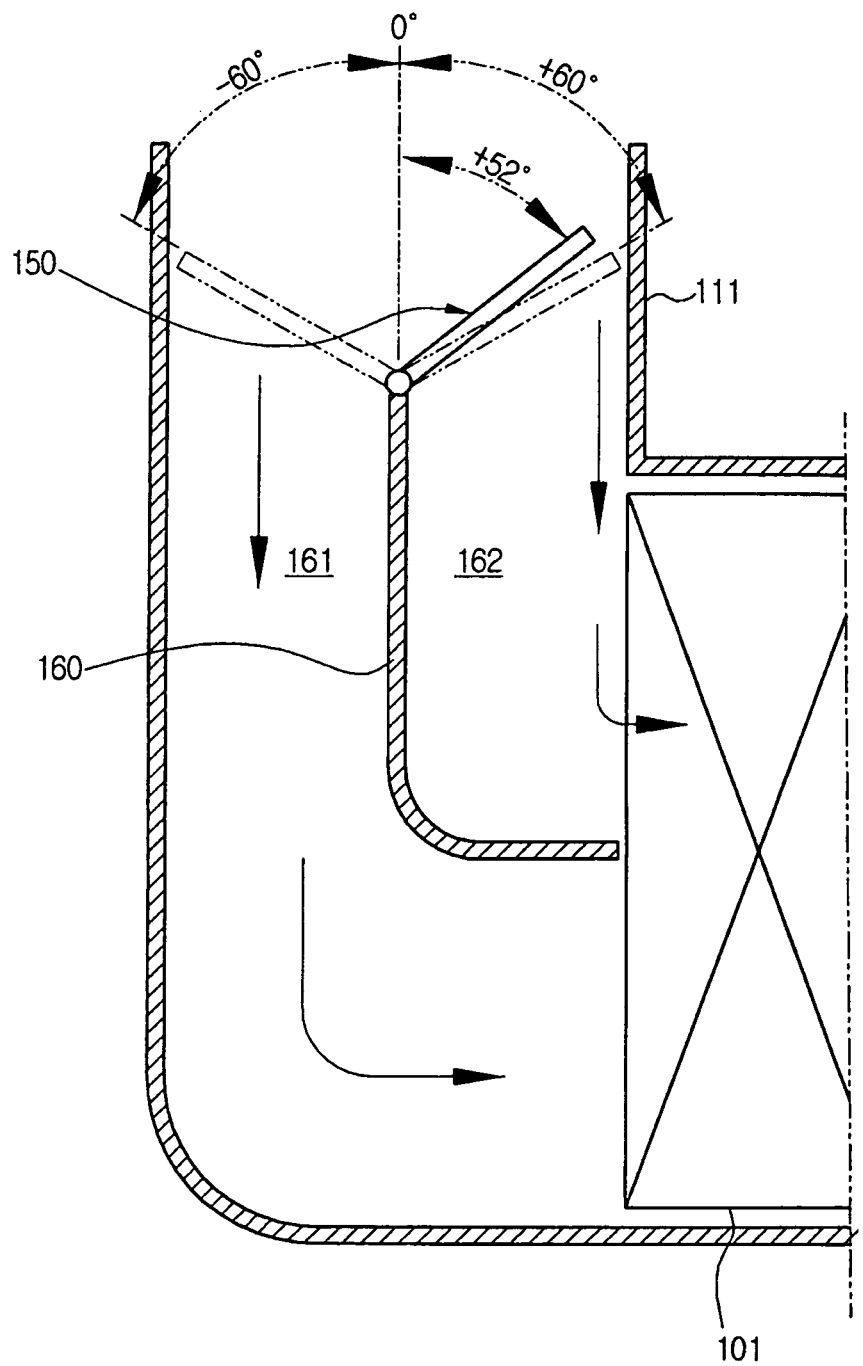
FIG. 6 is a view showing an example of a working position of the air volume controlling door when a blower of a driver's seat side is in the seventh level and a blower of a passenger's seat side is in the first level.
Figure 7:
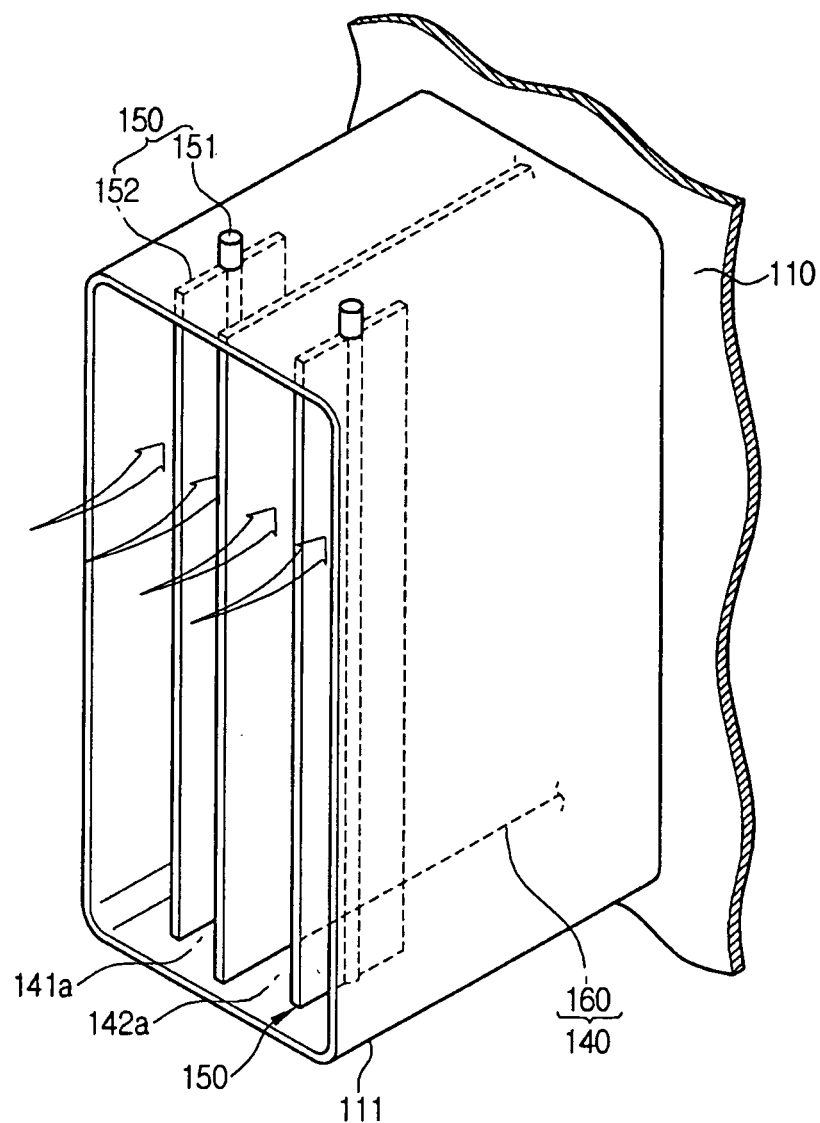
FIG. 7 is a perspective view showing a state where the inside of an air inflow port is partitioned into the right and left side by a sealing wall and air volume controlling doors are respectively mounted in right and left air passageways.
Figure 8:
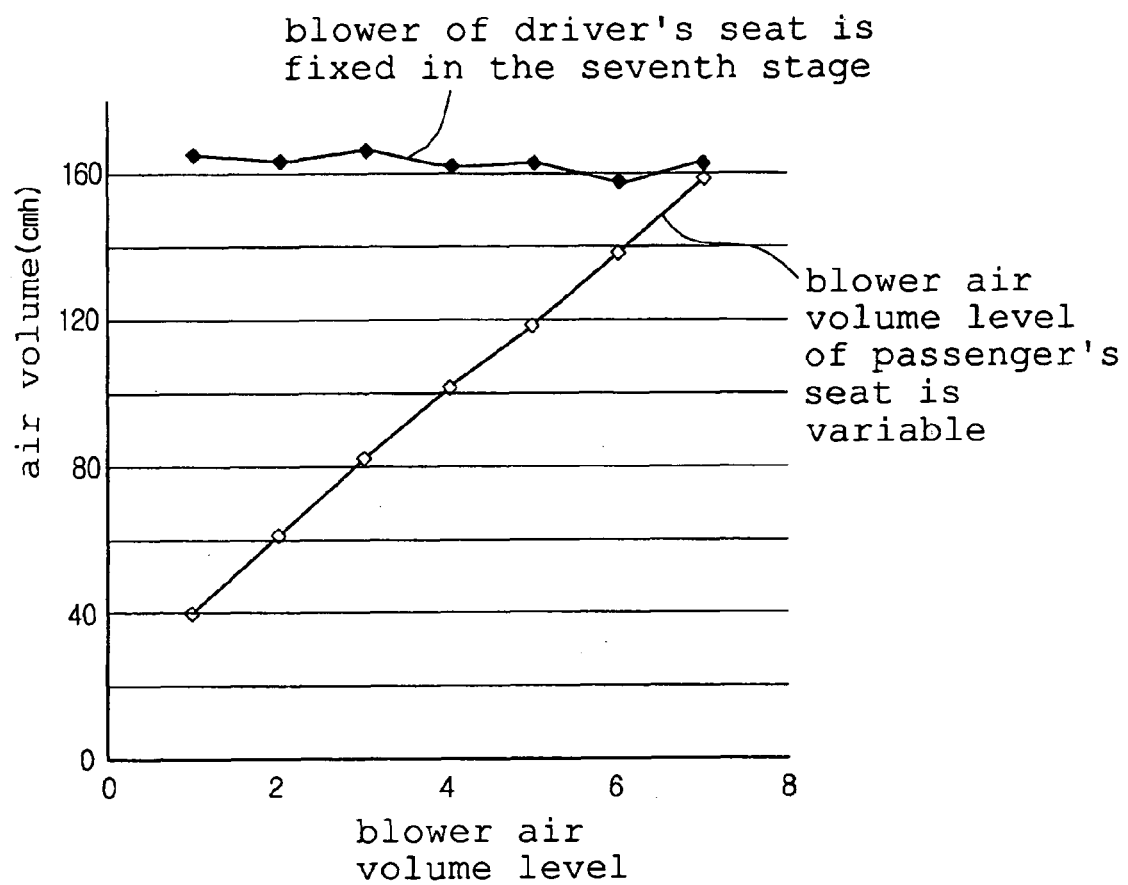
FIG. 8 is a graph of an air volume measured when the blower of the driver's seat side is fixed at the seventh level and the level of the blower of the passenger's seat side is variable.
Figure 9:
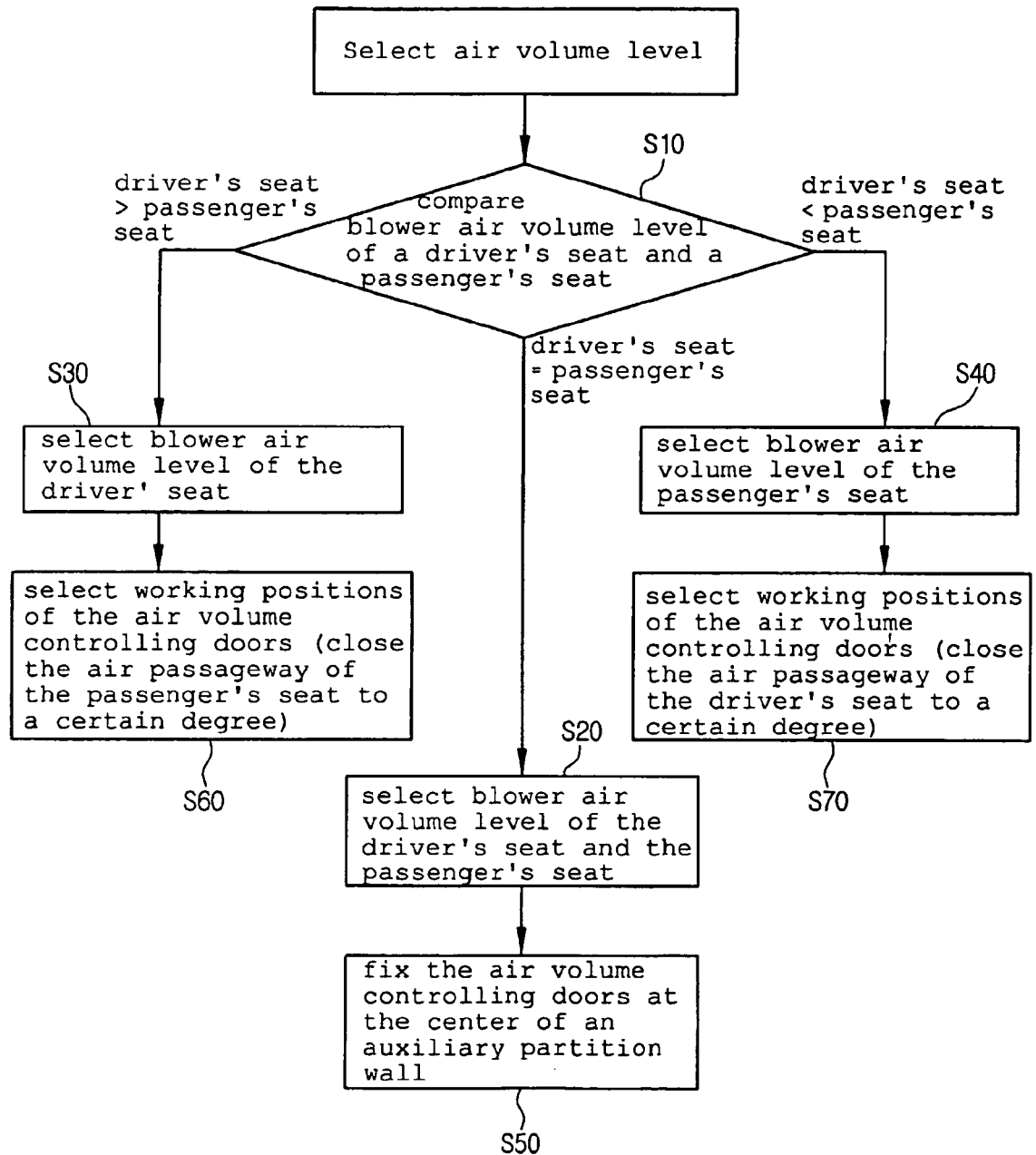
FIG. 9 is a block diagram of a method for controlling the dual zone type air conditioner for vehicles according to the present invention.

FIG. 2 is a configurative view of a dual zone type air conditioner for vehicles according to the present invention, FIG. 3 is a perspective view showing a state where the dual zone type air conditioner according to the present invention is applied to a semi-center type air conditioner, FIG. 4 is an enlarged perspective view showing a part where an air volume controlling door of FIG. 3 is mounted, FIG. 5 is a sectional view taken along the line of A-A of FIG. 3, FIG. 6 is a view showing an example of a working position of the air volume controlling door when a blower of a driver's seat side is in the seventh level and a blower of a passenger's seat side is in the first level, FIG. 7 is a perspective view showing a state where the inside of an air inflow port is partitioned into the right and left side by a sealing wall and air volume controlling doors are respectively mounted in right and left air passageways, FIG. 8 is a graph of an air volume measured when the blower of the driver's seat side is fixed at the seventh level and the level of the blower of the passenger's seat side is variable, and FIG. 9 is a block diagram of a method for controlling the dual zone type air conditioner for vehicles according to the present invention.

As shown in the drawings, the dual zone type air conditioner 100 according to the present invention includes: an air-conditioning case 110 having an air inflow port 111 formed on an inlet thereof, a plurality of air outflow ports 120 mounted on an outlet thereof and having a defrost vent 121, a face vent 122 and a floor vent 123, and air passageways formed inside the air-conditioning case 110 in such a way as to communicate the air inflow port 111 and the air outflow ports 120 with each other; an evaporator 101 and a heater core 102 spaced apart from each other at a predetermined interval and mounted on the air passageways in order; a partition wall 105 for partitioning the downstream side air passageways of the evaporator 101 into right and left air passageways; and a blower 10 mounted in such a way that its outlet 16 is connected to the air inflow port 111 of the air-conditioning case 110 in order to blow air to the inside of the air-conditioning case 110.

Here, the air-conditioning case 110 is constructed in such a way that separate right and left cases 110a and 110b are assembled with each other.

Furthermore, temperature-adjusting doors 130 for adjusting temperature are respectively mounted between the evaporator 101 and the heater core 102. The temperature-adjusting doors 130 are respectively mounted on the right and left air passageways 106a and 106b and adjust the degree of opening of an air passageway bypassing the heater core 102 and an air passageway passing the heater core 102.

Moreover, a plurality of mode doors 124 are mounted on the defrost vent 121, the face vent 122 and the floor vent 123 to perform various air-conditioning modes in such a way that the air selectively passing the heater core 102 after passing the evaporator 101 can be selectively distributed to each of ducts (not shown) communicating with specific positions of the inside of the vehicle.

In the meantime, the blower 10 includes: an inside air inlet (not shown) and an outside air inlet 11 mounted on an upper portion thereof to selectively introduce inside air and outside air; and a blast fan 15 mounted therein for blowing the air introduced through the inside and outside air inlets toward the air-conditioning case 110.

Additionally, the air inflow port 111 of the air-conditioning case 110 extends from the side of the air-conditioning case 110 to the outlet 16 of the blower 10 in such a way as to form a straight section of a predetermined length so as to be connected with the outlet 16 of the blower 10.

That is, as shown in the drawing, inner air passageways 141 and 142 of the air inflow port 111 are formed in such a way as to be at right angle to the right and left air passageways 106a and 106b partitioned by the partition wall 105 located inside the air-conditioning case 110. In this instance, the air inflow port 111 is paralleled to the evaporator 101.

Furthermore, a plurality of air volume controlling doors 150 are mounted inside the passageway formed between the evaporator 101 and the blower 10 to control the volume of air blown to the right and left air passageways 106a and 106b of the air-conditioning case 110.

It is preferable that the plural air volume controlling doors 150 are mounted inside the air inflow port 111 where a flow of air is relatively uniform due to a uniform cross section of the air passageway.

That is, since the inner passageways 141 and 142 of the air inflow port 111 are more uniform than any other parts of the air-conditioning case 110 and have no change in air volume because of their uniform cross section, the air volume controlling doors 150 are mounted inside the air inflow port 111.

Moreover, a sealing wall 140 is formed inside the air inflow port 111. The sealing wall 140 is mounted between the plural air volume controlling doors 150 to partition the air volume controlling doors 150.

Such a sealing wall 140 is formed in such a way as to partition the inside of the air inflow port 111 into an upper portion and a lower portion, the two air volume controlling doors 150 are mounted in the upper and lower air passageways 141 and 142 of the air inflow port 111 partitioned by the sealing wall 140 in such a way as to be independently operated.

In addition, the sealing wall 140 is formed in such a way as to correspond to a working range of the air volume controlling doors 150 inside the air inflow port 111. In this instance, the sealing wall 140 prevents a leak of air between the upper and lower air passageways 141 and 142 when the plural air volume controlling doors 150 separately control the upper and lower air passageways 141 and 142 of the air inflow port 111.

In the meantime, the plural air volume controlling doors 150 are independently operated through actuators 155 respectively mounted on upper and lower sides of the air inflow port 111.

Each of the air volume controlling doors 150 includes: a rotary shaft 151 vertically mounted at the center of the upper and lower air passageways 141 and 142 of the air inflow port 111; and a plate 152 formed on the side of the rotary shaft 151 and extending toward the outlet 16 of the blower 10 for adjusting a degree of right and left swing-opening of the upper and lower passageways 141 and 142 of the air inflow port 111.

In this instance, one end portion of the rotary shaft 151 of each of the air volume controlling doors 150 mounted on the upper and lower passageways 141 and 142 of the air inflow port 111 passes through the upper face and the lower face of the air inflow port 111 and is connected with the actuator 155.

Furthermore, an auxiliary partition wall 160 is formed between the air volume controlling doors 150 and the evaporator 101 for partitioning upstream side air passageways 161 and 162 of the evaporator 101 into right and left air passageways.

The auxiliary partition wall 160 has a front end portion adjacent to the rear of the rotary shaft 151 of the air volume controlling door 150 and a rear end portion adjacent to the front of the evaporator 101 in a state where it is bent toward the evaporator 101.

In this instance, the rear end portion of the auxiliary partition wall 160 adjacent to the front of the evaporator 101 is located on the same line as the partition wall 105 mounted inside the air-conditioning case 110.

Accordingly, since the air introduced after being controlled in the right and left air volume by the air volume controlling doors 150 is completely divided into right and left sides by the auxiliary partition wall 160 formed between the air volume controlling doors 150 and the evaporator 101, it is prevented that the right and left side airs are mixed with each other till the air separately controlled by the air volume controlling doors 150 is introduced into the right and left air passageways 106a and 106b of the air-conditioning case 110, whereby a complete dual zone type air volume control system can be realized.

Furthermore, since the two air volume controlling doors 150, which are mounted in the upper and lower passageways 141 and 142 of the air inflow port 111 partitioned by the sealing wall 140 in such a way as to be independently operated, control the volume of air introduced into the right and left passageways 161 and 162 of the auxiliary partition wall 160, the present invention can control the right and left air volume more minutely than the conventional air conditioner having only one air volume controlling door 150 to control the right and left air volume.

As one example, the one air volume controlling door 150 mounted in the lower passageway 142 of the air inflow port 111 can control the right and left air volume in a state where the other air volume controlling door 150 mounted in the upper passageway 141 of the air inflow port 111 entirely closes the right passageway 162 of the auxiliary partition wall 160 (in this instance, the right passageway 162 corresponds to one air volume controlling door), whereby the present invention has good controllability in controlling the right and left air volume and can control the air volume more accurately and minutely since the two air volume controlling doors 150 control the right and left air volume at the same time.

Furthermore, the conventional air conditioner generates a noise due to a narrow area where air passes since it uses only one air volume controlling door 40 in case that the air volume controlling door 40 is located at the minimum air volume spot. However, the air conditioner according to the present invention can control the air volume by the one air volume controlling door 150 in a state where the other air volume controlling door 150 entirely closes the one side passageway of the auxiliary partition wall 160, and hence, increase an opening angle of the air volume controlling door 150 as much again as the air volume controlling door 40 of the conventional air conditioner while maintaining the same minimum air volume as the conventional air conditioner in a minimum air volume mode, whereby the present invention can reduce the noise since the area where air passes is wide.

Moreover, the present invention can control the right and left air volume accurately since the air volume controlling doors 150 are mounted inside the air inflow port 111 where the cross section of each air passageway is uniform, the flow of air is relatively uniform and there is no change in air volume.

Additionally, in the above, it is described that the plural air volume controlling doors 150 are mounted inside the air inflow port 111, but may be mounted inside the outlet 16 of the blower 10.

In the meantime, the sealing wall 140 is horizontally mounted inside the air inflow port 111 to thereby partition the inside of the air inflow port 111 into the upper and lower portions, and the air volume controlling doors 150 are respectively mounted in the upper and lower passageways 141 and 142 of the air inflow port 111 partitioned by the sealing wall 140. However, as another example, as shown in FIG. 7, the sealing wall 140 may be formed vertically inside the air inflow port 111 to thereby partition the inside of the air inflow port 111 into the right and left portions, and the air volume controlling doors 150 are mounted in the right and left passageways 141a and 142a of the air inflow port 111 partitioned by the sealing wall 140 in such a way as to be independently operated.

In this instance, the sealing wall 140 formed vertically inside the air inflow port 111 is formed in such a way that the auxiliary partition wall 160 extends to the inner front end of the air inflow port 111.

Furthermore, the air volume controlling doors 150 mounted in the right and left passageways 141a and 142a of the air inflow port 111 are center-pivot type doors each having a plate 152 formed on both sides of the rotary shaft 151.

As described above, the plural air volume controlling doors 150 can be mounted vertically or horizontally inside the air inflow port 111 according to a direction that the sealing wall 140 formed inside the air inflow port 111 is formed. In order to increase the cross section to pass air, it is preferable that the plural air volume controlling doors 150 are mounted vertically rather than horizontally.

Moreover, the driver of the passenger can set a wanted air volume when he or she independently controls right and left air volume controlling switches (not shown) mounted inside the vehicle to thereby adjust the level of the blower of the driver's seat side and the level of the blower of the passenger's seat side.

As described above, the driver and the passenger can control the air volume of the driver's seat side and the passenger's seat side by adjusting the level of the blower or using the air volume controlling doors 150.

In this instance, when set air volumes of the driver's seat side and the passenger's seat side are different from each other, a controlling part (not shown) is provided to operate and control the air volume controlling doors 150 to supply the set air volume to the driver's seat side and the passenger's seat side after selecting the more air volume side out of the driver's setting and the passenger's setting as the level of the blower.

That is, when the driver and the passenger set the air volume differently from each other, a higher side out of the level of the blower selected by the driver and the level of the blower selected by the passenger is selected as the actual level of the blower, and in this instance, the controlling part supplies a voltage corresponding to the higher level to the blower 10 to thereby actuate the blower 10.

As one example, if the driver selects the air volume blown toward the driver's seat into the seventh level and the passenger selects the air volume blown toward the passenger's seat into the first level, the controlling part selects the seventh level, which is the higher side, and supplies a voltage corresponding to the seventh level to the blower 10 to actuate the blower 10.

In this instance, while the driver can be supplied with his or her wanted air volume since the blower 10 is actuated in the seventh level, the passenger may have an unpleasant feeling since the blower 10 is actuated in the seventh level even though the passenger wants the first level of the blower 10. Accordingly, the passenger can lower the air volume into the first level by controlling the air volume controlling doors 150.

As described above, since the blower 10 is actually actuated in the higher level out of the blower levels selected by the driver and the passenger, through a control of the controlling part, the air volume is reduced since the passageway of the less air volume side (lower level side) out of the right and left passageways 161 and 162 partitioned by the auxiliary partition wall 160 is closed (shut) to a certain degree by the air volume controlling door 150.

FIG. 6 illustrates an example of a working position of the air volume controlling doors 150 when the blower of a driver's seat side is in the seventh level and the blower of a passenger's seat side is in the first level. Since the driver's seat side is in the seventh level and the passenger's seat side is in the first level, the blowers are actuated in the seventh level, and in this instance, the working position of the air volume controlling door 150 becomes ±52°, and hence, the left passageway 161 of the auxiliary partition wall 160 (driver's seat side passageway) is completely opened but the right passageway 162 (passenger's seat side passageway) is closed to a certain degree. Accordingly, while the air volume corresponding to the seventh level is supplied to the driver's seat side since the blowers 10 are actuated in the seventh level, the air volume corresponding to the first level is supplied to the passenger's seat side since the passageway is opened to the certain degree (corresponding to the first level) by the air volume controlling door 150.

FIG. 9 is a graph of an air volume measured when the driver's seat side blower is fixed in the seventh level and the level of the passenger's seat side blower is variable. As shown in the drawing, if the level of the passenger's seat side blower is variable, an air volume corresponding to the level of the blower is supplied while the working position of the air volume controlling doors 150 is variable from the first level to the seventh level, and in this instance, even though the air volume of the passenger's seat side is increased linearly according to the level of the blower, the air volume of the driver's seat side where the level of the blower is fixed maintains the air volume of the seventh level without any change. Here, the blower of the passenger's seat side is in the seventh level when the working position of the air volume controlling door 150 is located in a straight line with the auxiliary partition wall 160.

In the meantime, in the case that the blower of the driver's seat side is in the seventh level and the blower of the passenger's seat side is in the first level and in the case that the blower of the driver's seat side is in the seventh level and the blower of the passenger's seat side is in the seventh level, the applied voltages of the blowers 10 are uniform but the applied voltages by the level of the blower are changed linearly. That is, in the former case, the voltage corresponding to the seventh level, which is the higher level, is supplied to the blower, but, in the latter case, the voltage corresponding to the seventh level is supplied to the blower 10 since the driver's seat and the passenger's seat are in the same level.

Additionally, if the set air volume (blower level) of the driver's seat side and the set air volume (blower level) of the passenger's seat side are symmetrical with each other, the controlling part controls the air volume controlling door 150 in such a way that the air volume controlling doors 150 are operated in right and left symmetry relative to the auxiliary partition wall 160.

The above will be described referring to FIG. 6. When the blower of the driver's seat side is in the seventh level and the blower of the passenger's seat side is in the first level, the working position of the air volume controlling doors 150 becomes +52°. On the contrary, when the blower of the passenger's seat side is in the seventh level and the blower of the driver's seat side is in the first level, the working position of the air volume controlling doors 150 becomes −52°. As described above, when the set air volume of the driver's seat side and the set air volume of the passenger's seat side are symmetrical with each other, the working positions of the air volume controlling doors 150 are also symmetrical with each other.

Since the air volume controlling doors 150 are mounted at places where the cross section of the passageway is uniform, in a development level of the air conditioner, in order to set the working position of the air volume controlling doors 150 by the level of the blower, once the working position of the air volume controlling door 150 is set to control the air volume by the level of the blower of the driver's seat side, a setting value of the working position of the air volume controlling door 150 by the level of the blower of the passenger's seat side can be a value, which is symmetric to the setting value of the driver's seat side.

Moreover, the setting values of the working positions of the air volume controlling doors 150 of the driver's seat side and the passenger's seat side can be used as they are without changing the setting value by the air-conditioning mode. As one example, setting values of the working positions of the air volume controlling doors 150 of the driver's seat side and the passenger's seat side in a vent mode can use a setting value of another air-conditioning mode as it is.

Accordingly, the present invention can reduce a development period of the air conditioner, be simplified in structure through linearization of a working logic of the air volume conditioning doors 150, and prevent errors since the working logic is simplified.

Hereinafter, a method for controlling the dual zone type air conditioner for the vehicles according to the present invention will be described.

First, when the driver and the passenger manipulate an air volume control switch (not shown) to select the air volume (level of the blowers), a first step (S10) of comparing the blower levels of the driver's seat side and the passenger's seat side is carried out.

As a comparison result of the first step (S10), when the blower levels of the driver's seat side and the passenger's seat side are the same, a second step (S20) of selecting the blower levels of the driver's seat side and the passenger's seat side as an actual blower level is carried out.

After the second step (S20), a fifth step (S50) of fixing the air volume controlling doors 150 at the center of the auxiliary partition wall 160 to supply the same air volume to the driver's seat side and the passenger's seat side is carried out.

As one example, if the blower of the driver's seat side is in the seventh level and the blower of the passenger's seat side is in the seventh level, the actual blower level is selected into the seventh level.

Additionally, the working positions of the air volume controlling doors 150 are in the same straight line as the auxiliary partition wall 160 since the air volumes of the driver's seat side and the passenger's seat side are all in the seventh level, and hence, the air volume corresponding to the seventh level of the blower is supplied to the right and left passageways 161 and 162 of the auxiliary partition wall 160 equally.

Continuously, as the comparison result of the first step (S10), when the blower level of the driver's seat side is higher than the blower level of the passenger's seat side, a third step (S30) of selecting the level of the driver's seat side as the actual blower level is carried out.

After the third step (S30), a sixth step (S60) of selecting the working position of the air volume controlling door 150 in such a way as to close the right passageway 162 (passenger's seat side) of the right and left passageways 161 and 162, which are partitioned by the auxiliary partition wall 160, to a certain degree to thereby reduce the air volume of the passenger's seat side is carried out.

As one example, if the blower of the driver's seat side is in the seventh level and the blower of the passenger's seat side is in the first level, the actual blower level is selected into the seventh level of the driver's seat side, which is a higher level.

In this instance, since the air volume of the passenger's seat side must be reduced to the first level, the working position of the air volume controlling door 150 is controlled in such a way that the right passageway 162 (passenger's seat side) of the auxiliary partition wall 160 is closed to the certain degree to thereby supply only the air volume corresponding to the first level of the blower to the passenger's seat side. Of course, even though the air volume corresponding to the first level is supplied to the passenger's seat side, the air volume corresponding to the seventh level is supplied to the driver's seat side uniformly.

Furthermore, as a comparison result of the first step (S10), if the blower level of the passenger's seat side is higher than the blower level of the driver's seat side, a fourth step (S40) of selecting the level of the passenger's seat side as the actual blower level is carried out.

After the fourth step (S40), a seventh step (S70) of selecting the working position of the air volume controlling door 150 in such a way as to close the left passageway 161 (driver's seat side) of the right and left passageways 161 and 162, which are partitioned by the auxiliary partition wall 160, to the certain degree to thereby reduce the air volume of the driver's seat side is carried out.

As one example, if the blower of the driver's seat side is in the first level and the blower of the passenger's seat side is in the seventh level, the actual blower level is selected into the seventh level of the passenger's seat side, which is a higher level.

In this instance, since the air volume of the driver's seat side must be reduced to the first level, the working position of the air volume controlling door 150 is controlled in such a way that the left passageway 161 (driver's seat side) of the auxiliary partition wall 160 is closed to the certain degree to thereby supply only the air volume corresponding to the first level of the blower to the driver's seat side. Of course, even though the air volume corresponding to the first level is supplied to the driver's seat side, the air volume corresponding to the seventh level is supplied to the passenger's seat side uniformly.

Hereinafter, an air flow process of the dual zone type air conditioner for vehicles according to the present invention will be described. Here, a cooling mode (see FIG. 2) as the representative mode will be described.

First, the air blown through the outlet 16 of the blower 10 is introduced into the air inflow port 111.

The air introduced into the air inflow port 111 is separately introduced into the upper and lower passageways 141 and 142 of the air inflow port 111 by the sealing wall 140, and then, the right and left air volumes are controlled by the two air volume controlling doors 150 mounted in the upper and lower passageways 141 and 142. The air controlled in the right and left air volume is completely divided into the right and left sides by the auxiliary partition wall 160, and then, passes the evaporator 101 after being introduced to the inside of the air-conditioning case 110.

The air passing the evaporator 101 is converted into cold air while passing the evaporator 101, and the cold air heat-exchanged in the evaporator 101 is distributed into the left air passageway 106a and the right air passageway 106b by the inner partition wall 105 of the air-conditioning case 110.

In this instance, the air distributed into the left air passageway 106a and the right air passageway 106b is continuously and separately distributed in a state where it is controlled in the right and left air volume by the air volume controlling doors 150.

Continuously, the air converted into the cold air while passing the evaporator 101 bypasses the heater core 102 by the temperature-adjusting doors 130, and then, is discharged to the inside of the vehicle through the opened vents 121, 122 and 123 by the mode doors 124, whereby the driver's seat and the passenger's seat inside the vehicle are cooled.

Of course, during the above process, if the two air volume controlling doors 150 mounted in the air inflow port 111 in such a way as to be actuated separately, the temperature-adjusting doors 130 mounted on the right and left sides of the partition wall 105 in such a way as to be actuated separately, and the mode doors 124 are respectively and independently controlled, the driver and the passenger can independently control the driver's seat side and the passenger's seat side in their wanted air volume, temperature, and air-conditioning mode.

In the meantime, only the cooling mode is described in this specification, but various air-conditioning modes including a heating mode may be performed, and a detailed description of the air-conditioning modes will be omitted since they are known previously.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:
1. A dual zone type air conditioner for vehicles, which includes:
    an air-conditioning case having an air inflow port formed on an inlet thereof, a plurality of air outflow ports mounted on an outlet thereof, and air passageways formed therein to communicate the air inflow port and the air outflow ports with each other;
    an evaporator and a heater core spaced apart from each other at a predetermined interval and mounted on the air passageways of the air-conditioning case;
    a partition wall for partitioning a downstream side air passageways of the evaporator into right and left air passageways; and
    a blower mounted on the air inflow port of the air-conditioning case, wherein an outlet of the blower is connected to the air inflow port;
    a sealing wall horizontally mounted inside the air inflow port perpendicular to an auxiliary partition wall to thereby partition the inside of the air inflow port into upper and lower portions;
    a pair of air volume controlling doors respectively mounted at an area of the sealing wall in the upper and lower portions of the air inflow port, wherein the sealing wall is positioned between the pair of volume controlling doors, the air volume controlling doors being indepen- dently operated from each other and independently capable of swinging right and left;

the auxiliary partition wall formed perpendicularly to the sealing wall between the air volume controlling doors and the evaporator to partition upstream side air passageway of the evaporator into right and left portions.

2. The dual zone type air conditioner according to claim 1, wherein each of the air volume controlling doors comprises:

a rotary shaft vertically mounted at a center of the upper and lower portions of the air inflow port; and a plate formed on a side of the rotary shaft and extending toward the outlet of the blower to adjust a degree of right and left swing-opening of the upper and lower portions of the air inflow port.

3. The dual zone type air conditioner according to claim 1, wherein the air inflow port extends from a side of the air-conditioning case to the outlet of the blower to form a straight section of a predetermined length, the straight section of the air inflow port being connected with the outlet of the blower.

* * * * *